United States Patent
Ogawa (10) Patent No.: US 8,013,598 B2
(45) Date of Patent: Sep. 6, 2011

(54) OBJECT DETECTING DEVICE FOR DETECTING OBJECT USING ELECTROMAGNETIC INDUCTION

(75) Inventor: Yasuji Ogawa, Kurihashi-machi (JP)

(73) Assignee: Newcom, Inc. (JP)

( * ) Notice: Subject to any disclaimer, the term of this patent is extended or adjusted under 35 U.S.C. 154(b) by 307 days.

(21) Appl. No.: 12/304,226

(22) PCT Filed: Jun. 4, 2007

(86) PCT No.: PCT/JP2007/000596
§ 371 (c)(1),
(2), (4) Date: Dec. 10, 2008

(87) PCT Pub. No.: WO2007/148429
PCT Pub. Date: Dec. 27, 2007

(65) Prior Publication Data
US 2009/0146654 A1    Jun. 11, 2009

(30) Foreign Application Priority Data
Jun. 19, 2006 (JP) .................................. 2006-169145

(51) Int. Cl.
*G01N 27/72* (2006.01)
*G01B 7/14* (2006.01)

(52) U.S. Cl. .............. 324/228; 324/207.11; 324/207.15; 324/229

(58) Field of Classification Search ................... None
See application file for complete search history.

(56) References Cited

U.S. PATENT DOCUMENTS

| | | | |
|---|---|---|---|
| 3,021,711 A | 2/1962 | Arvidson | |
| 3,722,288 A | 3/1973 | Weber | |
| 4,353,050 A | 10/1982 | Pelczyyk et al. | |
| 4,658,373 A | 4/1987 | Murakami et al. | |
| 4,918,418 A | 4/1990 | Tsala | |
| 4,944,187 A | 7/1990 | Frick | |
| 5,420,379 A | 5/1995 | Zank et al. | |
| 5,543,588 A | 8/1996 | Bisset et al. | |

(Continued)

FOREIGN PATENT DOCUMENTS

DE    102 52 862 B3    7/2004

(Continued)

*Primary Examiner* — Vinh P Nguyen
(74) *Attorney, Agent, or Firm* — Wells St. John P.S.

(57) ABSTRACT

Provided is an object detecting device, which can detect the shape of or the distance from an object made of an electrically conductive or magnetic material, and which can detect the position indicated by an object made of an electrically-non-conductive/non-magnetic material, such as a finger. The object detecting device detects the shape of or the distance from an object to be measured, which is placed on a detection surface and made of an electrically conductive or magnetic material, by using an electromagnetic induction. The object detecting device includes a first loop wire group of a plurality of first loop wires (1) arranged in parallel on the same plane, a second loop wire group of a plurality of second loop wires (2) arranged in parallel on the same plane, and a spacer (3) for keeping the distance between them at a constant. The plurality of the second loop wires (2) are individually arranged in a direction perpendicular to the plurality of the first loop wires (1). The object detecting device further includes a plurality of electromagnetic coupling portions for electromagnetically coupling the first loop wires and the second loop wires. A driver (20) drives the first loop wire group, and a detector (30) detects the change in the couplings of the electromagnetically coupling units from the second loop wire group.

12 Claims, 5 Drawing Sheets

U.S. PATENT DOCUMENTS

| | | | |
|---|---|---|---|
| 5,861,583 | A | 1/1999 | Schediwy et al. |
| 6,338,199 | B1 | 1/2002 | Chigira et al. |
| 6,471,613 | B1 | 10/2002 | Botosan et al. |
| 6,480,187 | B1 | 11/2002 | Sano et al. |
| 6,747,631 | B1 | 6/2004 | Sakamaki et al. |
| 6,803,906 | B1 | 10/2004 | Morrison et al. |
| 7,703,342 | B2 * | 4/2010 | Ogawa ..................... 73/862.046 |
| 7,800,362 | B1 * | 9/2010 | Ogawa .......................... 324/209 |
| 2001/0019325 | A1 | 9/2001 | Takekawa |
| 2002/0075243 | A1 | 6/2002 | Newton |
| 2002/0145595 | A1 | 10/2002 | Satoh |
| 2003/0141867 | A1 | 7/2003 | Inoue |
| 2004/0201575 | A1 | 10/2004 | Morrison |
| 2007/0146958 | A1 | 6/2007 | Babcock et al. |

FOREIGN PATENT DOCUMENTS

| | | | |
|---|---|---|---|
| EP | 1 698 874 | | 6/2006 |
| EP | 1873507 | * | 1/2008 |
| FJ | 61-135240 | | 8/1986 |
| JP | 51-46714 | | 12/1976 |
| JP | 52-045823 | | 4/1977 |
| JP | 57-100331 | | 12/1980 |
| JP | 57-11331 | | 6/1982 |
| JP | 57-165849 | | 5/1984 |
| JP | 62-226030 | | 3/1986 |
| JP | 62-31865 | Y2 | 8/1987 |
| JP | 62-226030 | | 10/1987 |
| JP | 1-212301 | A | 8/1989 |
| JP | 2-78925 | A | 3/1990 |
| JP | 6-46171 | B2 | 6/1994 |
| JP | 7-55615 | A | 3/1995 |
| JP | 09-113203 | | 5/1997 |
| JP | 10-198494 | | 7/1998 |
| JP | 2000-322201 | A | 11/2000 |
| JP | 2001-265517 | A | 9/2001 |
| JP | 2002-268807 | A | 9/2002 |
| JP | 2002-301264 | | 10/2002 |
| JP | 2003-294547 | | 10/2003 |
| JP | 2003-337071 | | 11/2003 |
| JP | 6-10269 | Y2 | 3/2004 |
| JP | 2005-156474 | A | 6/2005 |
| JP | 2005-275760 | | 10/2005 |
| JP | 3928976 | B1 | 6/2007 |
| WO | WO 02/03316 | A1 | 1/2002 |
| WO | WO 2004/104810 | | 2/2004 |
| WO | WO 2006/106714 | | 10/2006 |
| WO | WO 2008/007458 | A1 | 1/2008 |
| WO | WO 2008/050468 | A1 | 5/2008 |

* cited by examiner

OBJECT DETECTING DEVICE FOR DETECTING OBJECT USING ELECTROMAGNETIC INDUCTION

CROSS REFERENCE TO RELATED APPLICATION

This is a 35 U.S.C. §371 application of and claims priority to International Application No. PCT/JP2007/000596, which was filed on Jun. 4, 2007, and which claims priority to Japanese Patent Application No. 2006-169145, which was filed on Jun. 19, 2006, and the teachings of all the applications are incorporated herein by reference.

TECHNICAL FIELD

The present invention relates to an object detecting device for detecting an object and, more particularly, to an object detecting device that uses electromagnetic induction to detect the shape of an object to be measured made of an electrically conductive or magnetic material and the distance from the object to be measured.

BACKGROUND ART

There is known, as a conventional technique that uses electromagnetic induction to detect an object made of an electrically conductive or magnetic material, one disclosed in, e.g., Patent Document 1. This technique two-dimensionally arranges a plurality of sense coils on a detection surface and detects the position of a position indicator made of an electrically conductive or magnetic material from a change of inductances at respective sense coils. Further, there is known a technique disclosed in Patent Document 2 that arranges a plurality of sensor sections each having a cushion material between coils in a matrix form and detects a pressure distribution on the sensor section from a change in the degree of electromagnetic coupling.

Patent Document 1: Japanese Patent Application Kokai Publication No. Hei 10-198494
Patent Document 2: Japanese Patent Application Kokai Publication No. 2005-156474

DISCLOSURE OF THE INVENTION

Problems to be Solved by the Invention

However, the conventional object detecting devices for detecting an object made of an electrically conductive or magnetic material have the following problems. That is, the technique disclosed in Patent Document 1 aims to detect only an object made of an electrically conductive or magnetic material and, therefore, cannot detect the position indicated by an object made of non-conductive/non-magnetic material, such as a finger. Further, in this technique, switches having the same number as that of the sense coils are required, so that it is necessary to provide a large number of sense coils and switches in order to detect the shape of an object, thus increasing cost.

Further, in the technique disclosed in Patent Document 2, when an object made of an electrically conductive or magnetic material is placed on a sensor, an induced current or an induced voltage is decreased or increased due to influence of the electrically conductive or magnetic material, although the induced current or the induced voltage should be increased by a pressure. Therefore, the object that can be measured by this technique is limited to the conductive or magnetic material.

The present invention has been made in view of the above situation, and an object thereof is to provide an object detecting device capable of stably detecting, at low cost, the shape of an object made of an electrically conductive or magnetic material and the distance from the object and further capable of detecting the indication position of an object made of a non-conductive/non-magnetic material, such as a finger.

Means for Solving the Problems

To achieve the above object, according to an aspect of the present invention, there is provided an object detecting device that uses an electromagnetic induction to detect the shape of or the distance from an object to be measured made of an electrically conductive or magnetic material placed on a detection surface of the device, comprising: a first loop wire group in which a plurality of first loop wires each having a plurality of coil-shaped portions are arranged on the same plane in parallel to one another; a second loop wire group in which a plurality of second loop wires each having a plurality of coil-shaped portions are arranged on the same plane in parallel to one another, the second loop wire group being arranged in parallel to the first loop wire group, and the plurality of the second loop wires being arranged in perpendicular to the plurality of the first loop wires, respectively; a spacer that keeps the distance between the first loop wire group and the second loop wire group constant; a plurality of electromagnetic coupling portions at which the first loop wires and the second loop wires are electromagnetically coupled to each other through the coil-shaped portions located at the intersections between the first loop wires and the second loop wires; a driver that is connected to one of the first loop wire group and the second loop wire group and drives the loop wire group connected thereto; and a detector that is connected to the other one of the first loop wire group and the second loop wire group and detects a change in the degree of electromagnetic coupling at each of the electromagnetic coupling portions from the loop wire group connected thereto.

The coil-shaped portion of each of the first loop wires may be different in size from the coil-shaped portion of each of the second loop wires.

The object detecting device may comprise: a first loop wire group in which a plurality of first loop wires each having a plurality of coil-shaped portions are arranged on the same plane in parallel to one another; a second loop wire group in which a plurality of linear-shaped second loop wires are arranged on the same plane in parallel to one another, the second loop wire group being arranged in parallel to the first loop wire group, and the plurality of the second loop wires being arranged in perpendicular to the plurality of the first loop wires; a spacer that keeps the distance between the first loop wire group and the second loop wire group constant; a plurality of electromagnetic coupling portions at which the first loop wires and the second loop wires are electromagnetically coupled to each other through the coil-shaped portions located at the intersections between the first loop wires and the second loop wires; a driver that is connected to one of the first loop wire group and the second loop wire group and drives the loop wire group connected thereto; and a detector that is connected to the other one of the first loop wire group and the second loop wire group and detects a change in the degree of electromagnetic coupling at each of the electromagnetic coupling portions from the loop wire group connected thereto.

Further, the object detecting device may comprise: a first loop wire group in which a plurality of linear-shaped first loop wires are arranged on the same plane in parallel to one another; a second loop wire group in which a plurality of linear-shaped second loop wires are arranged on the same plane in parallel to one another, the second loop wire group being arranged in parallel to the first loop wire group, and the plurality of the second loop wires being arranged in perpendicular to the plurality of the first loop wires, respectively; a spacer that keeps the distance between the first loop wire group and the second loop wire group constant; a plurality of electromagnetic coupling portions at which the first loop wires and the second loop wires are electromagnetically coupled to each other through a plurality of conductive plates located in the vicinity of the intersections between the first loop wires and the second loop wires; a driver that is connected to one of the first loop wire group and the second loop wire group and drives the loop wire group connected thereto; and a detector that is connected to the other one of the first loop wire group and the second loop wire group and detects a change in the degree of electromagnetic coupling at each of the electromagnetic coupling portions from the loop wire group connected thereto.

The conductive plates may be provided in the vicinity of the portions between adjacent first loop wires and between adjacent second loop wires.

The conductive plates may be provided at the portions in the vicinity of the first loop wires and between adjacent second loop wires and be provided at the portions in the vicinity of the second loop wires and between adjacent first loop wires.

The conductive plates may be fixed such that the distance between the conductive plates and the first loop wire group and the distance between the conductive plates and the second loop wire group are constant, respectively.

The conductive plates may be provided in the vicinity of the first loop wire group and the second loop wire group through an elastic material. In this case, the distance between the conductive plates and the first loop wire group and the distance between the conductive plates and the second loop wire group are changed by a pressure applied to the conductive plates.

The conductive plates may be formed into a coil shape.

When an object to be measured and a position indicator different from the object to be measured are placed on the detection surface, the detector detects the shape of the object to be measured where the level of the output signal from one of the first loop wire group and the second loop wire group is decreased, while the detector detects the position indicated by the position indicator where the level of the output signal from one of the first loop wire group and the second loop wire group is increased.

The position indicator may have a synchronizing circuit synchronizing with a specific frequency. In this case, the driver drives the other one of the first loop wire group and the second loop wire group with the specific frequency.

At this time, when an object to be measured, position indicator having the synchronizing circuit, and position indicator not having the synchronizing circuit are placed on the detection surface, the driver drives the other one of the first loop wire group and the second loop wire group with a first frequency and a second frequency and the synchronizing circuit synchronizes with the second frequency. When the level of the output signal from one of the first loop wire group and the second loop wire group is decreased where the other one of the first loop wire group and the second loop wire group is driven with the first frequency, the detector may detect the shape of the object to be measured. When the level of the output signal from one of the first loop wire group and the second loop wire group is increased where the other one of the first loop wire group and the second loop wire group is driven with the first frequency, the detector may detect the position indicated by the position indicator not having the synchronization circuit. When the level of the output signal obtained where the other one of the first loop wire group and the second loop wire group is driven with the second frequency is higher than the level of the output signal obtained where the other one of the first loop wire group and the second loop wire group is driven with the first frequency, the detector may detect the position indicated by the position indicator having the synchronization circuit.

Advantages of the Invention

The object detecting device according to the present invention has an advantage of capable of stably detecting the shape of an object made of an electrically conductive or magnetic material and the distance therefrom with a low cost structure. Further, the object detecting device can be configured to detect non-conductive material/non-magnetic material, such as a finger, as well as the position indicated by a position indicator incorporating a synchronizing circuit.

BEST MODE FOR CARRYING OUT THE INVENTION

Figure 1:
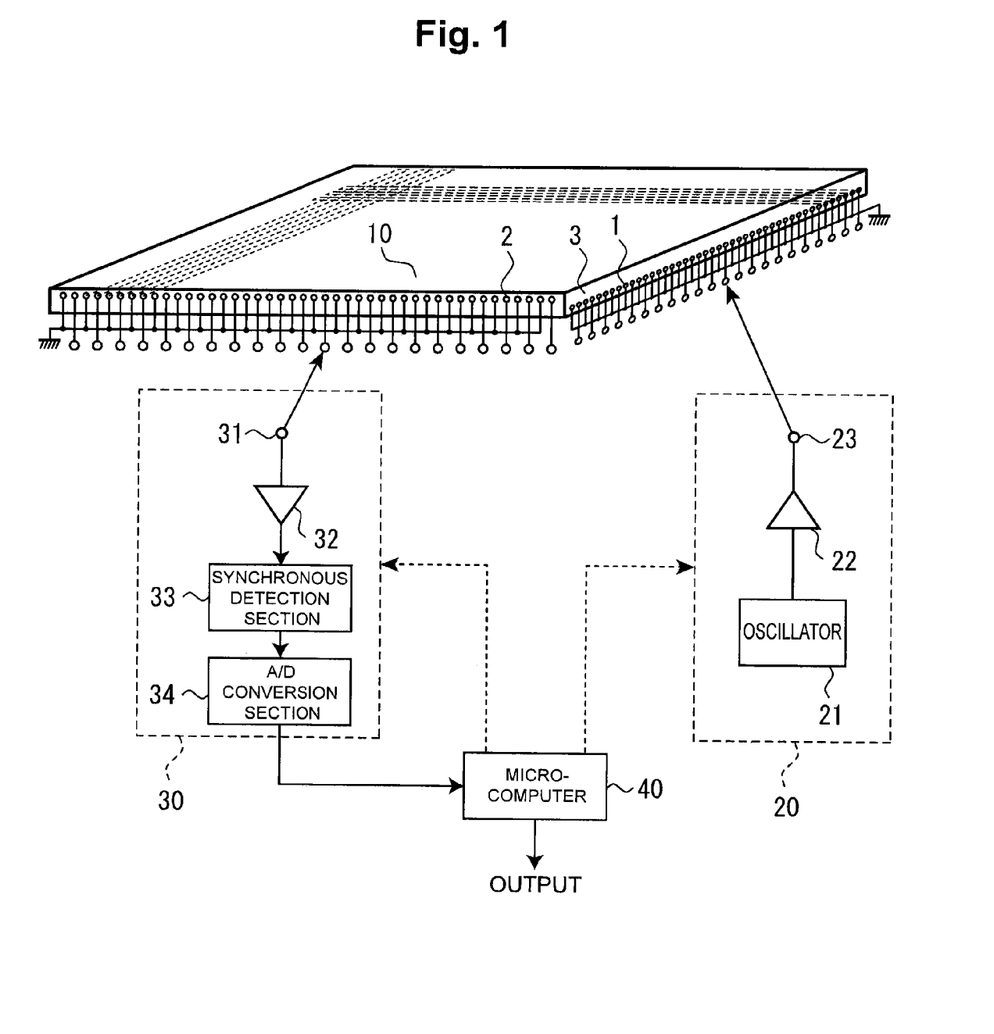
FIG. 1 is a schematic view for explaining the entire configuration of an object detecting device according to the present invention.

A preferred embodiment for practicing the present invention will be described with reference to the accompanying drawings. FIG. 1 is a schematic view for explaining the entire configuration of an object detecting device according to the present invention. As illustrated, the object detecting device according to the present invention has, on its detection surface 10, a first loop wire group having a plurality of first loop wires 1 and a second loop wire group having a plurality of second loop wires 2. The object detecting device according to the present invention further includes a drive section 20 which is connected to the first loop wires 1 so as to drive the first loop wire group and a detection section 30 which is connected to the second loop wire 1 so as to detect a change in the degree of electromagnetic coupling from the second loop wire group. Although the drive section 20 is connected to the first loop wires 1 and the detection section 30 is connected to the second loop wires 2 in FIG. 1, the present invention is not limited to this configuration, but the drive section 20 may be connected to the second loop wires 2 and the detection section 30 may be connected to the first loop wires 1.

In the object detecting device of the present invention, the first loop wires 1 and the second loop wires 2 constitute the detection surface 10 providing electromagnetic coupling portions, and the first loop wires 1 are driven at a high frequency. When an object to be measured made of an electrically conductive material is placed on the detection surface, the degree of electromagnetic coupling is reduced due to influence (shielding effect) of the object to be measured, with the result that the induced current or the induced voltage measured from the second loop wires 2 becomes smaller. On the other hand, when an object to be measured made of a magnetic material is placed on the detection surface, the degree of electromagnetic coupling is increased, with the result that the induced current or the induced voltage measured from the second loop wires 2 becomes larger. The object detecting device of the present invention utilizes this phenomenon to detect the positions of the electromagnetic coupling portions at which a change appears to thereby detect the shape of the object to be measured and the distance from the same. In the case where an object to be measured is made of an electrically conductive material with nonconstant conductivity or made of a magnetic material with nonconstant permeability, a change distribution of the conductivity or permeability can also be detected.

In the object detecting device according to the present invention, the first loop wire group is constituted by the plurality of first loop wires 1 which are arranged in the same plane in parallel to one another. The second loop wire group is constituted by the plurality of second loop wires 2 which are arranged in the same plane in parallel to one another. The second loop wire group is arranged in parallel to the first loop wire group, and the second loop wires 2 are arranged in perpendicular to the first loop wires 1. A predetermined space is formed between the first and second loop wire groups so as to keep a distance therebetween constant. That is, an insulating material 3 is disposed between the first and second loop wire groups so that they do not contact each other and the distance therebetween is kept constant. The insulating material 3 may be integrated with or separated from a material constituting the detection surface 10.

In the object detecting device according to the present invention, the first loop wires 1 and the second loop wires 2 are electromagnetically coupled to each other. Hereinafter, a more specific configuration of the electromagnetic coupling portions of the object detecting device according to the present invention will be described.

Figure 2:
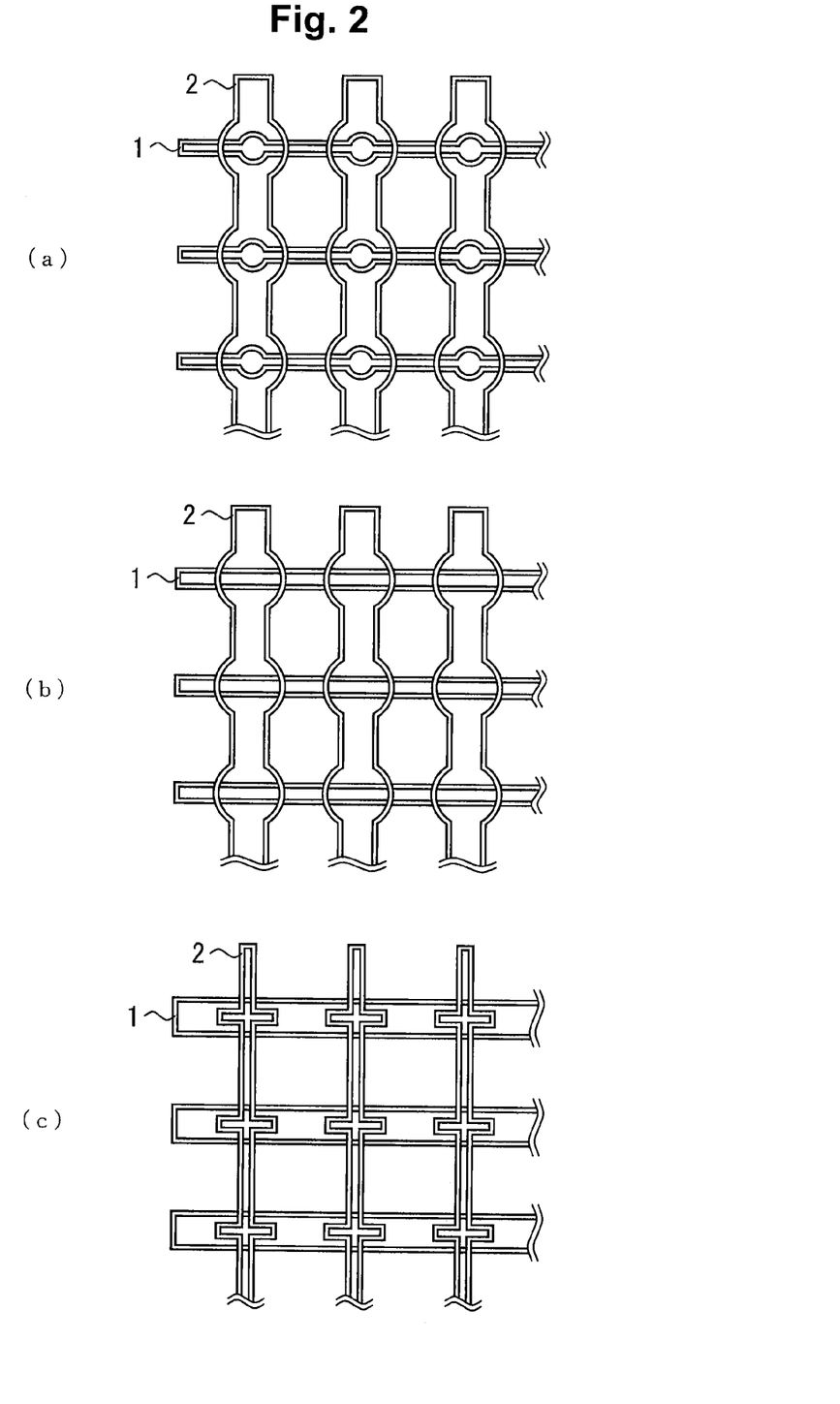
FIG. 2 is a top view of a part of a detection surface to explain a configuration of electromagnetic coupling portions of the object detecting device according to the present invention.

FIG. 2 is a top view of a part of the detection surface to explain a configuration of the electromagnetic coupling portion of the object detecting device according to the present invention. FIG. 2 (*a*) shows an example in which respective wires are formed in a coil shape, FIG. 2 (*b*) shows an example in which wires of one group are formed in a coil shape and wires of the other group are formed in a linear shape, and FIG. 2 (*c*) shows an example in which wires of one group are formed in a rectangular shape and wires of the other group are formed in a linear shape. In the object detecting device according to the present invention, the electromagnetic coupling portions can be formed as shown in FIG. 2 (*a*) so that the first and second loop wires 1 and 2 are electromagnetically coupled to each other. In the example of FIG. 2 (*a*), the first loop wires 1 are formed in an arch shape to constitute a small-diameter coil, and the second loop wires 2 perpendicular to the first loop wires 1 are formed, in an overlapped manner, in an arch shape to constitute a large-diameter coil. This configuration allows formation of the electromagnetic coupling portions. Although the diameter of the coil-shaped arch formed by the first loop wires 1 is smaller than that formed by the second loop wires 2 in the example in the drawing, the present invention is not limited to this configuration. For example, the diameter of the coil-shaped arch formed by the first loop wires 1 may be equal to that formed by the second loop wires 2.

The electromagnetic coupling portions can also be formed as shown in FIG. 2 (*b*) so that the first and second loop wires 1 and 2 are electromagnetically coupled to each other. In the example of FIG. 2 (*b*), the second loop wires 2 are formed in an arch shape to constitute a coil, and the first loop wires 1 perpendicular to the second loop wires 2 are formed in a linear shape. This configuration also allows formation of the electromagnetic coupling portions. Although the second loop wires 2 are formed in an arch shape and the first loop wires 1 are formed in a linear shape in this example, the present invention is not limited to this configuration but a configuration may be employed in which the second loop wires 2 are formed in a linear shape and the first loop wires 1 are formed in an arch shape. The loop wires of the object detecting device according to the present invention may have any shape such as rhombic shape or spiral shape as long as they form coils that can electromagnetically be coupled.

The electromagnetic coupling portions can also be formed as shown in FIG. 2 (*c*) so that the first and second loop wires are electromagnetically coupled to each other. In the example of FIG. 2 (*c*), the second loop wires 2 are formed in a rectangular shape to constitute a coil, and the first loop wires 1 perpendicular to the second loop wires 2 are formed in a linear shape. This configuration also allows formation of the electromagnetic coupling portions. Although the second loop wires 2 are formed in a rectangular shape and the first loop wires 1 are formed in a linear shape in this example, the present invention is not limited to this configuration but a configuration may be employed in which the second loop wires 2 are formed in a linear shape and the first loop wires 1 are formed in a rectangular shape. Further, a configuration may be employed in which both the first and second loop wires are formed in a rectangular shape.

As described above, the first and second loop wires are so formed as to electromagnetically be coupled to each other. It is possible to form each of the electromagnetic coupling portions into a coil of various shapes, such as an arch shape, a linear shape, and a rhombic shape so as to allow the first and second loop wires to electromagnetically be coupled to each other. Further, the coil size at the electromagnetic coupling portions may be the same between the loop wires on the drive side and loop wires on the detection side. Alternatively, however, the coil size may be different between the first and second loop wires. An experiment conducted by the present inventor revealed that when the coil size is different between the first and second loop wires, the detection sensitivity is increased. More specifically, according to the present inventor's experiment conducted under a given condition, when an object to be measured was placed on the detection surface, about a 20% change occurred in the case where the coil size was the same between the first and second loop wires, while about a 60% change occurred in the case where the one of the coils was half size of the other between the first and second loop wires. As is clear from the result, it is preferable to change the coil size between the first and second loop wires in order to increase the detection sensitivity. Note that even when the small or large coils are used as a drive coil, the same result as above was obtained.

Figure 3:
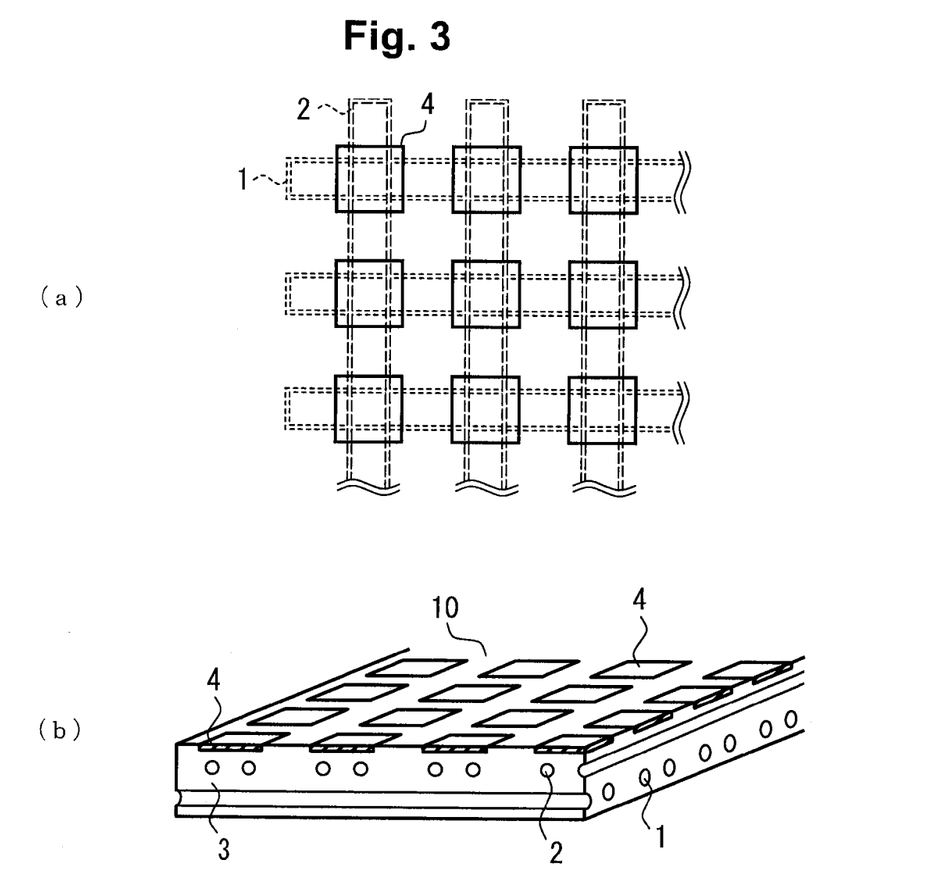
FIG. 3 is a view for explaining another configuration of the electromagnetic coupling portion of the object detecting device according to the present invention.

Further, in the object detecting device according to the present invention, the electromagnetic coupling portions can be formed as shown in FIG. 3 so that the first and second loop wires 1 and 2 are electromagnetically coupled to each other in an indirect manner. FIG. 3 shows an example in which the first and second loop wires are formed in a linear shape, respectively, and conductive plates are disposed near the overlapping portions between the first and second loop wires so as to allow the first and second loop wires to electromagnetically be coupled to each other. FIG. 3 (*a*) is a top view of a part of the detection surface, and FIG. 3 (*b*) is a perspective cross-sectional view of a part of the detection surface. As illustrated, each of the electromagnetic coupling portions is provided by forming a conductive plate 4 in the vicinity of each portion at which the linearly formed first and second loop wires 1 and 2 orthogonally cross each other. Although electromagnetic coupling is not achieved between the linearly orthogonally formed first and second loop wires 1 and 2, when the conductive plates 4 are thus provided, an eddy current occurs to allow indirect electromagnetic coupling to be achieved between the first and second loop wires 1 and 2. Although the conductive plates 4 are provided above the portions at which the first and second loop wires orthogonally cross each other in the drawing, the present invention is not limited thereto, but the conductive plates may be provided below the portions at which the first and second loop wires orthogonally cross each other as long as the electromagnetic coupling is achieved. Further, although the conductive plates 4 are so provided as to cover the portions at which the first and second loop wires 1 and 2 orthogonally cross each other in the drawing, the present invention is not limited thereto, but the conductive plates 4 may be provided inside the quadrangle areas defined by the wires that cross each other so as not to overlap with the wires when viewed from the above. In such a case, it is possible to provide the conductive plates 4 not above the first loop wires 1 or the second loop wires 2, but on the same plane as the first loop wires 1 or the second loop wires 2.

Figure 4:
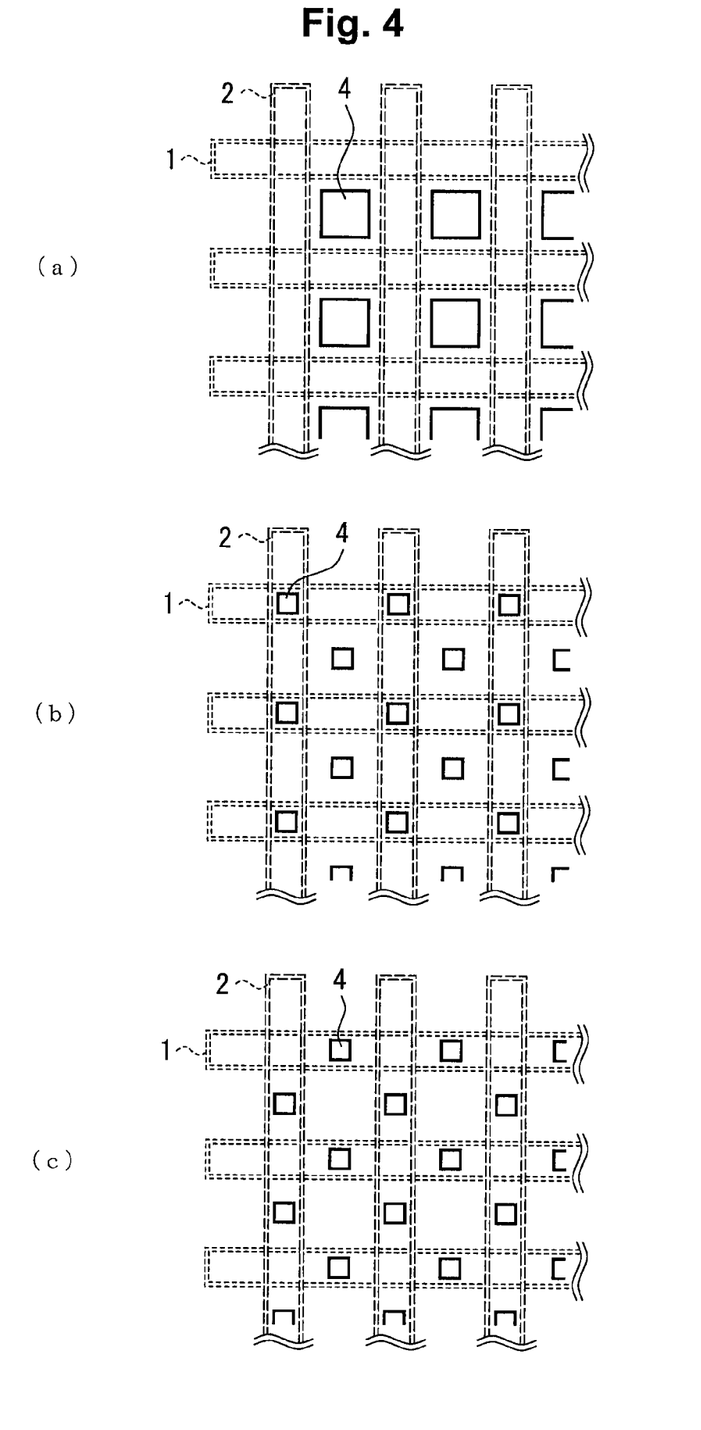
FIG. 4 is a view for explaining a variation of arrangement of the conductive plates in the object detecting device according to the present invention.

Except the vicinity of the portions at which the first and second loop wires 1 and 2 orthogonally cross each other, the conductive plates 4 may be provided in the following patterns. FIG. 4 is a view for explaining a variation of arrangement of the conductive plates in the object detecting device according to the present invention. FIG. 4 (a) shows an example in which the conductive plates 4 are provided in the vicinity of the portions between adjacent first loop wires 1 in the first loop wire group and between adjacent second loop wires 2 in the second loop wire group. FIG. 4 (b) shows an arrangement example obtained by combining the configurations shown in FIG. 3 and FIG. 4 (a), in which the conductive plates 4 are provided in the vicinity of the portions at which the first and second loop wires 1 and 2 orthogonally cross each other and in the vicinity of the portions between adjacent first loop wires 1 in the first loop wire group and between adjacent second loop wires 2 in the second loop wire group. FIG. 4 (c) shows an example in which the conductive plates 4 are provided at the portions in the vicinity of the first loop wires 1 and between adjacent second loop wires 2 and at the portions in the vicinity of the second loop wires 2 and between adjacent first loop wires 1. With such arrangement patterns of the conductive plates, the electromagnetic portions can be formed. Although the conductive plates 4 are provided inside the quadrangle areas defined by the wires that orthogonally cross each other so as not to overlap with the wires when viewed from the above in the drawing, the present invention is not limited to this, but the conductive plates 4 may be provided in such a manner as to overlap with the wires when viewed from above, as shown in FIG. 3.

If it is necessary only to detect the shape of an object made of an electrically conductive or magnetic material to be placed on the detection surface and the distance from the object, the conductive plates 4 may be fixed such that the distance between the conductive plates 4 and the first loop wire group and the distance between the conductive plates 4 and the second loop wire group are constant, respectively. The conductive plates 4 may be buried in the insulating material 3 constituting the detection surface 10 or may be protected from being exposed using a protecting sheet or the like. Further, although the conductive plates 4 have a quadrangle shape in the drawing, the present invention is not limited to this, but the conductive plates 4 may be formed in a circular shape or in a coil shape having a hole at its center.

A specific detection procedure of the object detecting device according to the present invention will be described with reference once again to FIG. 1. First, the first loop wire group is driven by the drive section 20. More specifically, the drive section 20 is mainly constituted by a high-frequency oscillator 21, a driver 22, and a switch 23 and the drive section 20 is sequentially connected to the respective first loop wires to thereby sequentially drive the first loop wires 1. Alternatively, a configuration may be adopted in which a driving frequency is changed for each first loop wire and the first loop wires are driven at a time.

The second loop wires 2 are connected to the detection section 30 that detects a change in the degree of electromagnetic coupling between the first and second loop wires 1 and 2. The detection section 30 is mainly constituted by a switch 31, an amplifier 32, a synchronous detection section 33, and an A/D conversion section 34. The detection section 30 is sequentially connected to the second loop wires 2 to thereby sequentially detect an induced current or an induced voltage from the second loop wires. The synchronous detection section 33, which is connected also to the output from the oscillator 21, multiplies the output from the oscillator 21 by the output from each of the second loop wires, and time-integrates the results. A configuration may be adopted in which an induced current or an induced voltage may be detected at a time from all the detection coils by individually providing the detection circuits for respective second loop wires or by using a frequency filter circuit in a combined manner.

The drive section 20 and the detection section 30 are controlled by a microcomputer 40 such as DSP, etc. and are configured to be able to obtain a desired output. Specifically, the drive section 20 is first connected to a first one of the first loop wires, and the detection section 30 is sequentially connected to the second loop wires so as to measure output signals at this routine. After that, the drive section 20 is connected to a second one of the first loop wires, and the detection section 30 is sequentially connected to the second loop wires so as to measure output signals at this routine. By repeating the above procedure, output signals at all the positions on the detection surface 10 corresponding to the XY-coordinates of intersecting points between the first and second loop wires can be measured. A procedure may be adopted in which the detection section 30 is connected to a first one of the second loop wires, and the drive section 20 is sequentially connected to the first loop wires so as to measure output signals at this routine. The configurations of the drive section and the detection section are not limited to the example shown in FIG. 1 but the drive section and the detection section may have any configuration as long as the drive section can drive the first loop wires and the detection section can detect an induced current or an induced voltage from the second loop wires.

When an electrically conductive material is placed on the detection surface 10, the degree of electromagnetic coupling at each of the portions corresponding to the intersections between the first and second loop wires 1 and 2 which are covered by the electrically conductive material is reduced, with the result that an induced current or an induced voltage measured from the second loop wires 2 becomes reduced. Then, the XY-coordinates at which the output has been reduced are plotted. As a result, the shape of the electrically conductive material placed on the detection surface can be detected. In the case where the surface of the electrically conductive material on the side that contacts the detection surface is not flat but irregular, etc., the degree of the reduction of an induced current or an induced voltage measured from the second loop wires 2 changes. This allows detection of the distance between the electrically conductive material and the detection surface from the magnitude of the outputs. As a result, it is possible to detect the state of the surface of the electrically conductive material from a change distribution of the output. In the case where an electrically conductive material with nonconstant conductivity is placed on the detection surface, a change distribution of the conductivity can be detected from a change distribution of the output.

When magnetic material is placed on the detection surface 10, the degree of electromagnetic coupling at each of the portions corresponding to the intersections between the first and second loop wires 1 and 2 which are covered by the magnetic material is increased, with the result that an induced current or an induced voltage measured from the second loop wires 2 becomes increased. Then, the XY-coordinates at which the output has been increased are plotted. As a result, the shape of the magnetic material placed on the detection surface can be detected. In the case where the surface of the magnetic material on the side that contacts the detection surface is not flat but irregular, etc., the degree of the increase of an induced current or an induced voltage measured from the second loop wires 2 changes. This allows detection of the distance between the electrically conductive material and the detection surface from the magnitude of the outputs. As a result, it is possible to detect the state of the surface of the electrically conductive material from a change distribution of the output. In the case where a magnetic material with non-constant permeability is placed on the detection surface, a change distribution of the permeability can be detected from a change distribution of the output.

Figure 5:
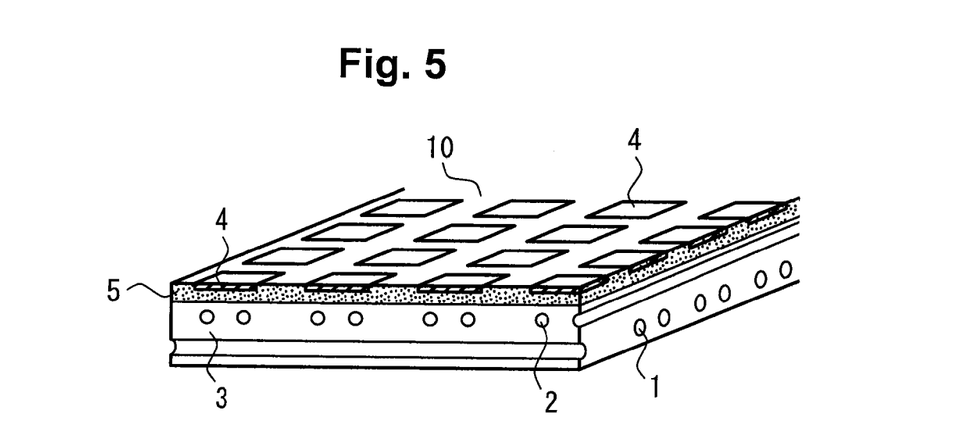
FIG. 5 is a perspective cross-sectional view of a part of the detection surface to explain another configuration example of the conductive plates in the object detecting device according to the present invention.

Another embodiment of the present invention will be described with reference to FIG. 5. The conductive plates shown in FIG. 3 are fixed such that the distance between the conductive plates 4 and the first loop wire group and the distance between the conductive plates 4 and the second loop wire group are constant, respectively. On the other hand, the embodiment shown in FIG. 5 has a configuration in which the distance between the conductive plates 4 and the first loop wire group and the distance between the conductive plates 4 and the second loop wire group are changed. As shown in FIG. 5, the first and second loop wires 1 and 2 are provided in the insulating material 3, and an elastic material 5 is provided between the insulating material 3 and the conductive plates 4. When a pressure is applied to the conductive plate 4, the distance between the conductive plates 4 and the first loop wire group and the distance between the conductive plates 4 and the second loop wire group is changed. When the distance between the conductive plates 4 and the first loop wire group and the distance between the conductive plates 4 and the second loop wire group are changed, the output signal from the second loop wires are changed. More specifically, when the distance between the conductive plates 4 and the first loop wire group and the distance between the conductive plates 4 and the second loop wire group become small, the degree of electromagnetic coupling is increased, so that an induced current or an induced voltage measured from the second loop wires becomes increased. The object detecting device of the present invention shown in FIG. 5 utilizes this phenomenon to thereby not only detect the shape of the electrically conductive or magnetic material and the distance therefrom but also detect the position at which the degree of electromagnetic coupling portion changes as the indication position to which a pressure is applied.

A specific detection procedure of the object detecting device according to the present embodiment will be described. In the case where an object made of an electrically-non-conductive/non-magnetic material, such as a finger or an insulator is placed on the detection surface 10 as a position indicator, the conductive plate 4 is brought close to the first and second loop wires 1 and 2, so that the degree of electromagnetic coupling at the indication position is increased with the result that the level of the output signal from the second loop wires 2 is increased. Similarly, in the case where an electrically conductive material is placed on the detection surface 10, the conductive plate 4 is brought close to the first and second loop wires 1 and 2 due to its weight to increase the degree of electromagnetic coupling. However, a shielding effect caused by the electrically conductive material is more powerful, so that the level of the output signal from the second loop wires 2 is decreased. Therefore, when the level of the output signal from the second loop wires 2 is decreased, the detection section 30 determines that an object placed on the detection surface 10 is an electrically conductive material and detects the shape of the electrically conductive material and the distance therefrom. When the level of the output signal from the second loop wires 2 is increased, the detection section 30 determines that an object placed on the detection surface 10 is a position indicator and detects the position indicated by the position indicator. In the case where a magnetic material is placed on the detection surface 10, the level of the output signal is increased as in the case of the electrically-non-conductive/non-magnetic material. However, it is possible to distinguish between the position indicator and the magnetic material because the degree of increase caused by the magnetic material is larger than that caused by a pressure from the indicator, or the area at which the level of the output signal is increased in the case of the magnetic material is wider than that in the case of the finger.

In the object detecting device according to the present invention, it is possible to use, as the position indicator other than the finger, a position indicator having a synchronizing circuit that synchronizes with a specific frequency. In this case, the drive section 20 drives the first loop wires with a specific frequency that synchronizes with the synchronizing circuit. When the position indicator having the synchronizing circuit is placed on the detection circuit 10, the degree of electromagnetic coupling at the indication position is increased, so that the level of the output signal from the second loop wires 2 is increased. This allows the detection section 30 to determine that an object placed on the detection surface 10 is an electrically conductive material when the level of the output signal from the second loop wires 2 is decreased and to detect the shape of the electrically conductive material and the distance therefrom and, further, to determine that an object placed on the detection surface 10 is a position indicator when the level of the output signal from the second loop wires 2 is increased and to detect the position indicated by the position indicator. In this case, various types of a position indicator, such as a card type, a pad type can be used as long as the position indicator has the synchronizing circuit.

Figure 6:
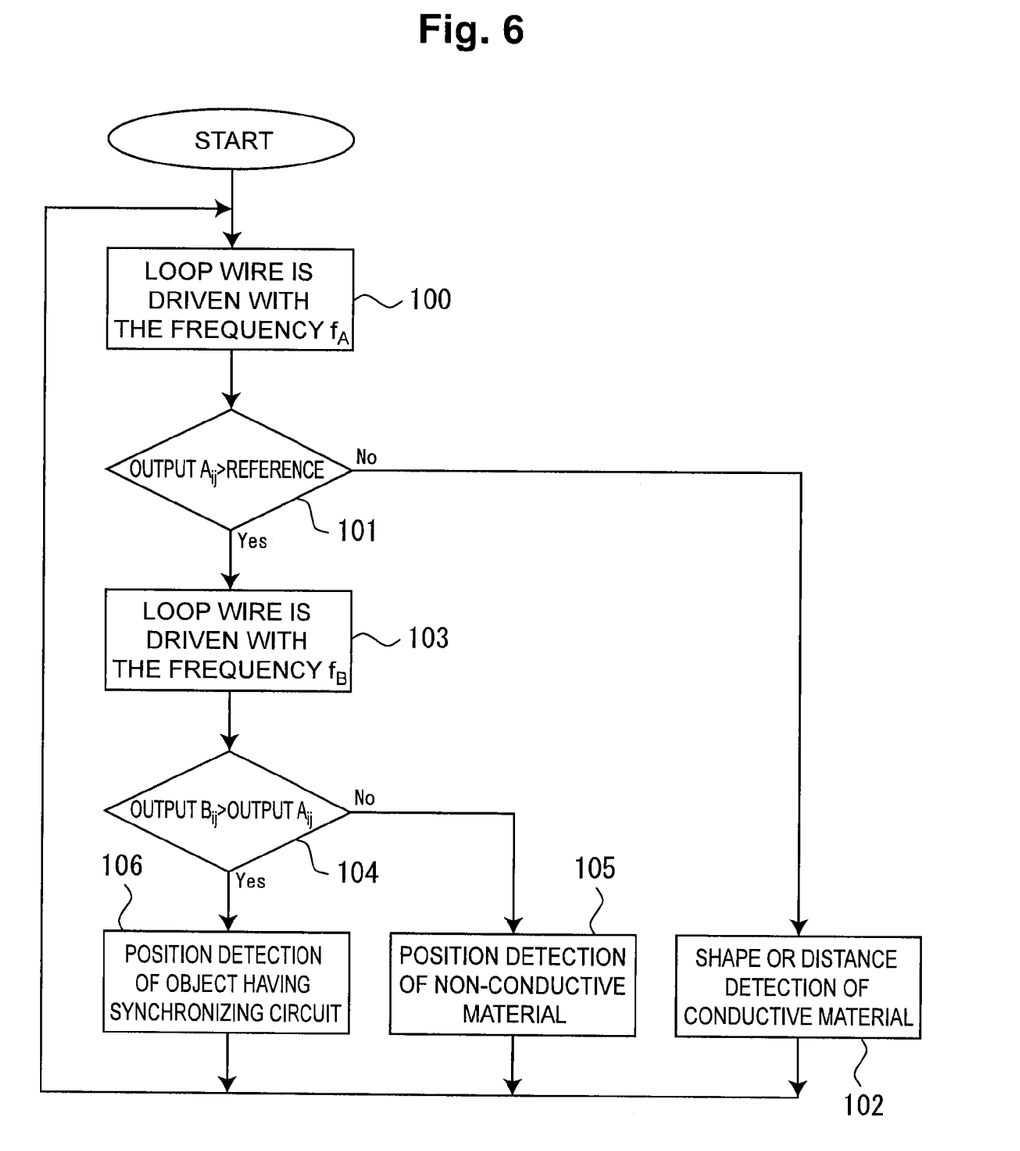
FIG. 6 is a flowchart for explaining the procedure for measuring various objects to be measured.

Further, when the first loop wires 1 are sequentially driven with a synchronizing frequency and another frequency, it is possible to not only detect the shape of an electrically conductive or magnetic material and the distance therefrom, but also detect, in a distinguished manner, a position indicator having the synchronizing circuit and a position indicator not having the synchronizing circuit. With reference to FIG. 6, a technique for detecting an object to be measured having the synchronizing circuit, an object to be measured not having the synchronizing circuit, and an electrically conductive or magnetic material in a distinguished manner will be described. FIG. 6 is a flowchart for explaining the procedure for measuring various objects to be measured. It is assumed as a premise that the object detecting device according to the present invention can drive the first loop wire group with a first frequency $f_A$ and a second frequency $f_B$. Further, it is assumed that the position indicator having the synchronizing circuit synchronizes with the second frequency $f_B$.

First, the first loop wire 1 is driven with the first frequency $f_A$ and an output signal $A_{ij}$ at that time is obtained from the second loop wire 2 (step 100). "i" and "j" denote the XY-coordinates at which respective signals are obtained. Then, it is determined whether the output signal $A_{ij}$ is increased or decreased with respect to a reference output signal indicating a state where nothing is placed on the detection surface (step 101). In the case where the output signal $A_{ij}$ is decreased, it is determined that an electrically conductive material is placed on the detection surface and the output signal is decreased by a shielding effect, and the shape of the electrically conductive material and the distance therefrom are detected (step 102). In the case where the output signal $A_{ij}$ is increased in step 101, the first loop wire 1 is driven with the second frequency $f_B$ to obtain an output signal $B_{ij}$ at that time (step 103). Then, it is detected whether the level of the output signal $B_{ij}$ is higher than the level of the output signal $A_{ij}$ (step 104). In the case where the level of the output signal $B_{ij}$ is not higher than (equal to) the level of the output signal $A_{ij}$ it is determined that a position indicator made of non-conductive/non-magnetic material, such as a finger, is placed on the detection surface and the conductive plates 4 are brought close to the first and second loop wires by a pressure to increase the output signal, and the position indicated by the non-conductive material is detected (step 105). In the case where the level of the output signal $B_{ij}$ is higher than the level of the output signal $A_{ij}$ in step 104, it is determined that a position indicator having the synchronizing circuit is placed on the detection surface and accordingly the level of the output signal is increased, and the position indicated by the position indicator having the synchronizing circuit is detected (step 106). By repeating the above steps for all the loop wires, it is possible to detect various objects in a distinguished manner.

Additionally, the following configuration may be employed. That is, the first loop wire group is previously driven with the first frequency $f_A$ and the second frequency $f_B$, and respective output results are stored. After that, in the case where the level of the output signal $B_{ij}$ is higher than the level of the output signal $A_{ij}$, a position indicator having the synchronizing circuit is detected; in the case where the level of the output signal $A_{ij}$ is increased, a position indicator made of non-conductive material, such as a finger, is detected; and in the case where the level of the output signal $A_{ij}$ is decreased, the shape of an electrically conductive material and the distance therefrom are detected.

Further, when a position indicator having another synchronizing circuit is used to drive the first loop wires with a frequency synchronizing with the another synchronizing circuit, it is possible to detect more number of position indicators in a distinguished manner. When the frequency is made variable, eddy current is increased as the frequency becomes higher, so that, strictly speaking, a change appears in the level of the output signal even if there is no change in an object placed on the detection surface. In order to compensate the change in the level of the output signal due to the frequency change, a compensation circuit may be provided, or a change smaller than a predetermined threshold value may be neglected.

The configuration of the object detecting device according to the present invention is not limited to the examples shown in the above illustrations, and various modifications may be made within the scope of the present invention.

BRIEF DESCRIPTION OF THE DRAWINGS

FIG. 2 (a) shows an example in which respective wires are formed in a coil shape, FIG. 2 (b) shows an example in which wires of one group are formed in a coil shape and wires of the other group are formed in a linear shape, and FIG. 2 (c) shows an example in which wires of one group are formed in a rectangular shape and wires of the other group are formed in a linear shape.

FIG. 3 (a) is a top view of a part of the detection surface, and FIG. 3 (b) is a perspective cross-sectional view of a part of the detection surface.

EXPLANATION OF REFERENCE SYMBOLS

1: First loop wire
2: Second loop wire
3: Insulating material
4: Conductive plate
5: Elastic material
10: Detection surface
20: Drive section
21: Oscillator
22: Driver
23: Switch
30: Detection section
31: Switch
32: Amplifier
33: Synchronous detection section
34: A/D conversion section
40: Microcomputer

What is claimed is:
1. An object detecting device that uses an electromagnetic induction to detect the shape of or the distance from an object to be measured made of an electrically conductive or magnetic material placed on a detection surface of the device, said device comprising:
   a first loop wire group in which a plurality of first loop wires each having a plurality of coil-shaped portions are arranged on the same plane in parallel to one another;
   a second loop wire group in which a plurality of second loop wires each having a plurality of coil-shaped portions are arranged on the same plane in parallel to one another, the second loop wire group being arranged in parallel to the first loop wire group, and the plurality of the second loop wires being arranged in perpendicular to the plurality of the first loop wires, respectively;
   a spacer that keeps the distance between the first loop wire group and the second loop wire group constant;
   a plurality of electromagnetic coupling portions at which the first loop wires and the second loop wires are electromagnetically coupled to each other through the coil-shaped portions located at the intersections between the first loop wires and the second loop wires;

a driver that is connected to one of the first loop wire group and the second loop wire group and drives the loop wire group connected thereto; and a detector that is connected to the other one of the first loop wire group and the second loop wire group and detects a change in the degree of electromagnetic coupling at each of the electromagnetic coupling portions from the loop wire group connected thereto.

2. The object detecting device according to claim 1, in which the coil-shaped portion of each of the first loop wires is different in size from the coil-shaped portion of each of the second loop wires.

3. The object detecting device according to claim 1, in which when an object to be measured and a position indicator different from the object to be measured are placed on the detection surface, the detector detects the shape of the object to be measured where the level of the output signal from one of the first loop wire group and the second loop wire group is decreased, while the detector detects the position indicated by the position indicator where the level of the output signal from one of the first loop wire group and the second loop wire group is increased.

4. The object detecting device according to claim 3, in which the position indicator has a synchronizing circuit synchronizing with a specific frequency, and the driver drives the other one of the first loop wire group and the second loop wire group with the specific frequency.

5. The object detecting device according to claim 4, in which when an object to be measured, position indicator having the synchronizing circuit, and position indicator not having the synchronizing circuit are placed on the detection surface, the driver drives the other one of the first loop wire group and the second loop wire group with a first frequency and the second frequency, the synchronizing circuit synchronizes with the second frequency, the detector detects the shape of the object to be measured when the level of the output signal from one of the first loop wire group and the second loop wire group is decreased where the other one of the first loop wire group and the second loop wire group is driven with the first frequency, the detector detects the position indicated by the position indicator not having the synchronization circuit when the level of the output signal from one of the first loop wire group and the second loop wire group is increased where the other one of the first loop wire group and the second loop wire group is driven with the first frequency, and the detector detects the position indicated by the position indicator having the synchronization circuit when the level of the output signal obtained where the other one of the first loop wire group and the second loop wire group is driven with the second frequency is higher than the level of the output signal obtained where the other one of the first loop wire group and the second loop wire group is driven with the first frequency.

6. An object detecting device that uses an electromagnetic induction to detect the shape of or the distance from an object to be measured made of an electrically conductive or magnetic material placed on a detection surface of the device, said device comprising:

a first loop wire group in which a plurality of first loop wires each having a plurality of coil-shaped portions are arranged on the same plane in parallel to one another;

a second loop wire group in which a plurality of linear-shaped second loop wires are arranged on the same plane in parallel to one another, the second loop wire group being arranged in parallel to the first loop wire group, and the plurality of the second loop wires being arranged in perpendicular to the plurality of the first loop wires, respectively;

a spacer that keeps the distance between the first loop wire group and the second loop wire group constant;

a plurality of electromagnetic coupling portions at which the first loop wires and the second loop wires are electromagnetically coupled to each other through the coil-shaped portions located at the intersections between the first loop wires and the second loop wires;

a driver that is connected to one of the first loop wire group and the second loop wire group and drives the loop wire group connected thereto; and a detector that is connected to the other one of the first loop wire group and the second loop wire group and detects a change in the degree of electromagnetic coupling at each of the electromagnetic coupling portions from the loop wire group connected thereto.

7. An object detecting device that uses an electromagnetic induction to detect the shape of or the distance from an object to be measured made of an electrically conductive or magnetic material placed on a detection surface of the device, said device comprising:

a first loop wire group in which a plurality of linear-shaped first loop wires are arranged on the same plane in parallel to one another;

a second loop wire group in which a plurality of linear-shaped second loop wires are arranged on the same plane in parallel to one another, the second loop wire group being arranged in parallel to the first loop wire group, and the second loop wires being arranged in perpendicular to the first loop wires;

a spacer that keeps the distance between the first loop wire group and the second loop wire group constant;

a plurality of electromagnetic coupling portions at which the first loop wires and the second loop wires are electromagnetically coupled to each other through a plurality of conductive plates located in the vicinity of the intersections between the first loop wires and the second loop wires;

a driver that is connected to one of the first loop wire group and the second loop wire group and drives the loop wire group connected thereto; and a detector that is connected to the other one of the first loop wire group and the second loop wire group and detects a change in the degree of electromagnetic coupling at each of the electromagnetic coupling portions from the loop wire group connected thereto.

8. The object detecting device according to claim 7, in which the conductive plates are provided in the vicinity of the portions between adjacent first loop wires and between adjacent second loop wires.

9. The object detecting device according to claim 7, in which the conductive plates are provided at the portions in the vicinity of the first loop wires and between adjacent second loop wires and provided at the portions in the vicinity of the second loop wires and between adjacent first loop wires.

10. The object detecting device according to claim 7, in which the conductive plates are fixed such that the distance between the conductive plates and the first loop wire group and the distance between the conductive plates and the second loop wire group are constant, respectively.

11. The object detecting device according to claim 7, in which the conductive plates are provided in the vicinity of the first loop wire group and the second loop wire group through an elastic material, and the distance between the conductive plates and the first loop wire group and the distance between the conductive plates and the second loop wire group are changed by a pressure applied to the conductive plates.

12. The object detecting device according to claim 7, in which the conductive plates are formed into a coil shape.

* * * * *

UNITED STATES PATENT AND TRADEMARK OFFICE
CERTIFICATE OF CORRECTION

PATENT NO. : 8,013,598 B2
APPLICATION NO. : 12/304226
DATED : September 6, 2011
INVENTOR(S) : Yasuji Ogawa It is certified that error appears in the above-identified patent and that said Letters Patent is hereby corrected as shown below:

Title Page 2, item (56), Col. 1, line 19 – Replace "FJ 61-135240  8/1986" with --JP 61-135240  8/1986--

Signed and Sealed this
Twenty-ninth Day of May, 2012

David J. Kappos
*Director of the United States Patent and Trademark Office*